United States Patent [19]

Brachtel et al.

[11] Patent Number: 4,755,367

[45] Date of Patent: Jul. 5, 1988

[54] PROCESS FOR THE PREPARATION OF COARSE-PARTICLE DICALCIUM PHOSPHATE DIHYDRATE

[75] Inventors: Gerold Brachtel, Mannheim; Guenter Raab, Laudenbach; Detlev Schober, Frankenthal, all of Fed. Rep. of Germany

[73] Assignee: Benckiser-Knapsack GmbH, Ladenburg, Fed. Rep. of Germany

[21] Appl. No.: 853,867

[22] Filed: Apr. 21, 1986

[30] Foreign Application Priority Data

May 2, 1985 [DE] Fed. Rep. of Germany ....... 3515695

[51] Int. Cl.$^4$ .................. C01B 15/16; C01B 25/26
[52] U.S. Cl. .................................. 423/309; 423/308
[58] Field of Search ............................................ 423/309

[56] References Cited

U.S. PATENT DOCUMENTS

| 3,134,719 | 5/1964 | Sheth | 167/82 |
| 4,166,839 | 9/1979 | Skauli et al. | 71/43 |
| 4,483,837 | 11/1984 | Cremer et al. | 423/309 |

FOREIGN PATENT DOCUMENTS

| 729532 | 3/1966 | Canada | 423/309 |
| 0054333 | 6/1982 | European Pat. Off. | |
| 2521099 | 9/1975 | Fed. Rep. of Germany | |
| 3227523 | 1/1984 | Fed. Rep. of Germany | |
| 782177 | 9/1957 | United Kingdom | 423/309 |
| 917328 | 2/1963 | United Kingdom | 423/309 |

*Primary Examiner*—John Doll
*Assistant Examiner*—Wayne A. Langel
*Attorney, Agent, or Firm*—Foley & Lardner, Schwartz, Jeffery, Schwaab, Mack, Blumenthal & Evans

[57] ABSTRACT

A process for the preparation of coarse-particle dicalcium phosphate dihydrate having a virtually spherical crystal shape and a particle size range between about 63 and 450 μm, preferably between about 90 and 300 μm, by reacting pure aqueous phosphoric acid with aqueous suspensions of precipitated chalks, wherein an amount of suspension corresponding to the reaction product formed is removed continuously or semicontinuously and the dicalcium phosphate dihydrate is separated off, washed and dried. Also disclosed is coarse-particle dicalcium phosphate dihydrate produced by the above process.

13 Claims, No Drawings

PROCESS FOR THE PREPARATION OF COARSE-PARTICLE DICALCIUM PHOSPHATE DIHYDRATE

BACKGROUND OF THE INVENTION

The present invention relates to a continuous or semicontinuous process for the preparation of coarse-particle dicalcium monohydrogen phosphate dihydrate from pure phosphoric acid and precipitated calcium carbonate. After appropriate drying, the products prepared by precipitation reactions are particularly suitable as carrier substances for direct tableting in the pharmaceutical industry.

Direct tableting is distinguished from conventional tableting methods in that the tablet mixture need not be subjected to any separate granulation process, for example, a wet or dry granulation, prior to pressing, in order to produce abrasion-resistant tablets having a long shelf life. Instead, the components can be pressed directly after the mixing procedures, resulting in a substantial saving of costs and time, as well as requiring less apparatus.

Dicalcium monohydrogen phosphate dihydrate (DCP dihydrate) is being used to an increasing extent as a carrier substance for direct tableting. For example, according to U.S. Pat. No. 3,134,719, unmilled DCP dihydrate having a coarse-particle structure is used effectively. It has been found that it is not sufficient simply to use unmilled, coarse-particle DCP dihydrate, but that, in order to achieve optimization and reproducibility in the compressive pressure/hardness properties, it is desirable to employ a DCP dihydrate having a certain particle structure (particle size and crystal shape). Regarding the particle size, the particle size in the range between about 63 and 450 $\mu$m, preferably between about 90 and 300 $\mu$m, has proven particularly suitable. In order to achieve optimum flow behavior, the crystal shape should be virtually spherical.

The essential precondition for a product suitable for direct tableting is fulfilled only when these two criteria are both met at the same time. Moreover, it is of course essential to meet the purity requirements (for example, heavy metal content, impurities) of the relevant pharmacopoeia.

DCP dihydrate is prepared in many places according to the prior art by conventional methods, for example, by reacting sodium phosphate with a calcium chloride solution (cf. Ullmanns Enzyklopeadie der technischen Chemie, 4th edition, volume 18, page 334, Weinheim 1979). However, the products prepared in this manner are generally so finely crystalline that they cannot be used for direct tableting. Although, under advantageous conditions, the fines (<75 $\mu$m), after appropriate compacting and comminution, for example, according to European Pat. No. 54,333, can also be used for tableting purposes; however, the procedure entails additional process steps and costs.

SUMMARY OF THE INVENTION

It is, therefore, an object of the present invention to provide a process for the preparation of DCP dihydrate in which the desired particle structure, i.e., virtually spherical crystals in a particle size range between about 63 and 450 $\mu$m, preferably between about 90 and 300 $\mu$m, can be obtained in a reproducible manner and in high yield.

Another object of the present invention is to provide a process of the type noted above which can obtain the DCP dihydrate at a stage as early as the precipitation reaction.

Yet another object of the present invention is to provide a DCP dihydrate having the desired particle structure.

In accomplishing the foregoing objectives, there has been provided, in accordance with one aspect of the present invention, a process for the preparation in coarse-particle dicalcium phosphate dihydrate having a substantially spherical crystal shape and a particle size range between about 63 and 450 $\mu$m, preferably between about 90 and 300 $\mu$m, comprising the steps of reacting a dicalcium phosphate dihydrate suspension comprising phosphoric acid having a pH between about 2.5 and 4, a high-grade phosphoric acid and an aqueous suspension of precipitated chalk, and maintaining the temperature of the reaction between about 10° and 60° C., preferably between about 20° and 45° C., and the pH range between about 2.5 and 4. Advantageously the phosphoric acid is added in a concentration of about 40 to 85%, and the precipitated chalk suspension is added in a concentration of about 20-40%. Also, it is preferred that the bulk density of the precipitated chalk be in the range between about 400 and 700 g/l, and particularly between about 500 and 600 g/l.

It is also preferred that the phosphoric acid be added in an amount slightly in excess of the theoretical stoichiometric amount, particularly about 10% in excess of the stoichiometric amount, and that the reaction be performed in a reactor having a large surface/volume ratio, preferably a horizontal mixing reactor.

The process can be performed continuously or semicontinuously. In the semicontinuous process the reacting step comprises the substeps of adding to a reactor which includes a dicalcium phosphate dihydrate suspension comprising phosphoric acid having a pH between about 2.5 and 4, the high-grade aqueous phosphoric acid and the aqueous suspension of precipitated chalk. The semicontinuous process comprises the further step of removing a portion of the reaction product, wherein the reaction product remaining in the reactor comprises a dicalcium phosphate dihydrate solution comprising phosphoric acid, which comprises about 30-60% of reactor capacity. This capacity corresponds to the capacity of the reactor prior to carrying out the semicontinuous process.

In the continuous process according to the present invention, the dicalcium phosphate dihydrate suspension, the high-grade aqueous phosphoric acid and the aqueous suspension of the precipitated chalk are added to the reactor and reacted, with the reaction product being transported out of the reactor.

In accordance with another aspect of the present invention, there has been provided a coarse-particle dicalcium phosphate dihydrate having a substantially spherical crystal shape and a particle size range between about 63 and 450 $\mu$m, preferably between about 80 and 300 $\mu$m, prepared by the process described above.

Other objects, features and advantages of the present invention will become more apparent upon a review of the detailed description of preferred embodiments which follows.

DETAILED DESCRIPTION OF PREFERRED EMBODIMENTS

In the process according to the present invention, DCP dihydrate suitable for direct tableting and having a virtually spherical crystal shape and a particle size between about 63 and 450 μm, preferably between about 90 and 300 μm, is obtained by reacting pure phosphoric acid with precipitated chalks or corresponding precipitated chalk suspensions. The process proceeds as a continuous precipitation reaction at temperatures between about 10° and 60° C., preferably between about 20° and 40° C., while maintaining certain external parameters. The end product is filtered off, washed thoroughly and dried. The latter steps are carried out in a known manner.

The preparation of DCP dihydrate by reacting phosphoric acid and calcium carbonates (the latter in the form of precipitated chalks and/or natural chalks) has long been known and is described in detail in, for example, German Offenlegungsschriften No. 25 12 099 or No. 32 27 523. The stated conditions always give end products which have a more or less random particle distribution and particle structure and in some cases are carbonate-containing. A reproducible preparation of DCP dihydrate with the required product properties is not possible by this method.

In order to carry out the process according to the present invention, the raw materials used, in particular the calcium carbonate, have to be chosen carefully. Of course, only raw materials of appropriate purity can be used for the preparation of DCP dihydrate employed in pharmaceutical products.

High-grade phosphoric acid, as can be used according to the present invention, is obtained by known processes, for example, by means of thermal processes or by means of extraction processes. In terms of purity, the calcium carbonate components available are, in principle, selected natural chalks or precipitated chalks purified by suitable precipitation processes. However, it has been found that natural chalks, presumably because of their mineral origin, react substantially more sluggishly with phosphoric acid than do precipitated chalks. This has an adverse effect on the course of the reaction, i.e., the rate of formation of the DCP dihydrate particles. In some cases the sluggishness results in a random effect. In order to obtain usable results, only defined precipitated chalks are, therefore, employed according to the present invention.

Where precipitated chalks are used, particular attention must be paid to their bulk density. It has been found that when precipitated chalks having very low bulk densities (<400 g/l) are used, products having a high content of fine particles (<63 μm) are obtained. Conversely, when precipitated chalks having very high bulk densities (>700 g/l) are used, products containing coarse particles with a pronounced lack of structure are obtained. According to the present invention, therefore, precipitated chalks having bulk densities between about 400 and 700 g/l, preferably between about 500 and 600 g/l, are employed.

Precipitated chalks are advantageously used in the form of aqueous suspensions. The concentration is chosen so that, in the reaction with phosphoric acid, the DCP dihydrate suspension formed has a solids content of about 20 to 40% by weight. A solids concentration which is too high or too low reduces the yield of product in the desired particle size range.

According to the invention, in order to obtain a carbonate-free end product, phosphoric acid is used in up to about a 10% excess, based on the theoretical amount, so that the resulting DCP dihydrate suspension always has a pH value <4. When $H_3PO_4$ is used in a stoichiometric amount, high pH values result and cause unreacted carbonate to be included in the precipitated DCP dihydrate, so that the end products are outside the specification range of the usual pharmacopoeia and, therefore, cannot be used for direct tableting.

In order that the release of $CO_2$ from the carbonate during the precipitation reaction is as uniform and contribute as possible, a reactor having as large a surface/volume ratio as possible is employed according to the invention. Elongated mixing reactors having a horizontal stirrer shaft are therefore preferably used. This type of reactor has proven particularly useful in the continuous reaction procedure.

In carrying out a large number of batch processes, it has been found that, because of the conditions described above, it is impossible to prepare, in a reproducible manner, a coarse-particled DCP dihydrate having a particle size range between about 63 and 450 μm. When the experiments are evaluated carefully, the following factors are noted:

- For reasons which are not clear, individual batches have an excessively high content of fine particles (up to 100% <125 μm; up to 40% <63 μm), so that they are virtually useless for direct tableting.
- The particle size distribution is subjected to random fluctuations from charge to charge. The different bulk densities and flow properties which result require a high degree of flexibility from the tableting factory supplied.
- The particle fraction >250 μm is virtually completely absent. Comparatively poor compressive pressure/hardness properties of the DCP dihydrate result.

Obviously, different nucleation and growth conditions are present in the individual bath processes and, in view of the heterogeneity of the overall reaction "solid (calcium carbonate)—liquid (aqueous phosphoric acid)—gaseous (carbon dioxide)", these conditions cannot be controlled satisfactorily from outside and hence lead to non-reproducible results.

According to the present invention, these difficulties can be overcome by a continuous or semicontinuous reaction procedure. This can be subdivided into the following steps which, when a suitable reactor is chosen, have a smooth transition from one step to the other:

Step 0: A phosphoric acid-containing aqueous suspension (2.5<pH<4) of a coarse DCP dihydrate prepared by a batch process or by this process is initially added to a reactor (30–60% of the capacity).

Step 1: Phosphoric acid (40–85% strength) and a precipitated chalk suspension (20–40% strength) are metered, with vigorous stirring, into the reactor over a predetermined time by means of pumps so that foaming over as a result of the evolution of $CO_2$ is avoided. An excess of phosphoric acid, i.e., a pH valve of the suspension of 2.5–4, is maintained.

Step 2: When the addition has ended, the reaction can be completed (release of $CO_2$) by means of a short subsequent reaction phase (5–15 minutes).

Step 3: Crystal suspension is removed from the reactor in an amount sufficient to reproduce the level in the reactor after step 0 (30–60% of the capacity).

The reaction cycle comprising steps 1 to 3 can then be repeated as often as desired so that a semicontinuous reaction procedure is achieved. The crystal suspension removed in each case is filtered, washed and dried by known methods. For drying, a fluidized bed has proven particularly advantageous. The process can also be carried out advantageously in a continuous mixer according to a fully continuous procedure in which an appropriate amount of DCP dihydrate can initially be added.

EXAMPLE 1

(comparative example)

This comparative example describes the procedure for a batch process. The evaluation (sieve analysis) of a plurality of experiments carried out according to these instructions is summarized in Table 1. As can be seen, pronounced fluctuations in the particle size distribution occur from charge to charge. The particle size range of $<250$ μm is not present.

In the process, 225 kg of a 58.5% strength phosphoric acid are initially added to a mixer having a capacity of 1 m$^3$ (speed of the stirrer shaft, 40 rpm). Thereafter, 220 kg of a 28% strength precipitated chalk suspension (bulk density of the dry precipitated chalk: 550 g/l) are pumped in via a metering pump in the course of 30 minutes, with vigorous evolution of CO$_2$. This amount corresponds approximately to the first neutralization stage of the phosphoric acid (monocalcium phosphate stage). The reactor temperature increases from 25° C. to about 34° C. during this procedure. Thereafter, a further 220 kg of the 28% strength precipitated chalk suspension are pumped in over 50 minutes. The pH valve of the resulting DCP dihydrate suspension is 3.2 after a subsequent reaction phase lasting 5 minutes. The end product is filtered off, washed acid-free with water and dried.

The X-ray photograph and analysis show that DCP dihydrate is present.

TABLE 1

| Particle size | Experimental Evaluation (Sieve Analysis) for Example 1 | | | | |
|---|---|---|---|---|---|
| | Experiment 1 | Experiment 2 | Experiment 3 | Experiment 4 | Experiment 5 |
| >250 μm | 0.0 | 0.0 | 0.0 | 0.0 | 0.0 |
| >125 μm | 66.6 | 15.4 | 0.4 | 76.0 | 1.4 |
| >90 μm | 29.0 | 58.4 | 25.8 | 19.6 | 23.8 |
| >63 μm | 3.8 | 21.0 | 56.2 | 2.0 | 49.0 |
| <63 μm | 0.6 | 5.2 | 17.6 | 2.4 | 25.8 |

EXAMPLE 2

(according to the present invention)

In a mixing reactor having a capacity of 1 m$^3$, 180 kg of a dry product obtained according to Example 1 are suspended in 430 kg of water.

The pH value is brought to 3.5 with concentrated phosphoric acid. Thereafter, 58 kg of an 85% strength phosphoric acid and 209 kg of a 23% strength precipitated chalk suspension (precipitated chalk as in Example 1) are metered in over 35 minutes. The level is brought to the old level (before the beginning of the precipitation) by discharging the required amount of DCP dihydrate, after which the precipitation procedure described can begin again.

After filtration, washing and drying, the products give the sieve analysis shown in Table 2. The X-ray photograph and analysis show that DCP dihydrate is present. The product satisfies the purity criteria of USP XX.

Compared with Table 1, the values summarized in Table 2 show that a semicontinuous reaction procedure makes it possible to obtain a reproducible particle size distribution with a uniform shape. In the course of several cycles, a shift from the initial fine product to the preferred coarser structures is observed.

TABLE 2

| Particle size | Experimental Evaluation (Sieve Analysis) for Example 2 | | | | | | | | |
|---|---|---|---|---|---|---|---|---|---|
| | Cycle 0 | Cycle 1 | Cycle 2 | Cycle 3 | Cycle 4 | Cycle 5 | Cycle 10 | Cycle 20 | Cycle 30 |
| >355 μm | 0.0 | 0.0 | 0.0 | 2.2 | 2.1 | 6.3 | 4.0 | 2.4 | 7.6 |
| >250 μm | 0.0 | 0.6 | 6.8 | 18.2 | 17.5 | 18.3 | 16.2 | 20.0 | 28.6 |
| >125 μm | 77.6 | 89.6 | 86.6 | 65.4 | 49.4 | 52.8 | 53.7 | 57.0 | 49.8 |
| >90 μm | 8.6 | 4.8 | 3.6 | 6.6 | 24.0 | 18.4 | 18.0 | 13.8 | 7.6 |
| >63 μm | 7.2 | 3.0 | 1.8 | 3.6 | 5.8 | 3.0 | 6.2 | 4.4 | 3.4 |
| <63 μm | 6.6 | 2.0 | 1.2 | 4.0 | 1.2 | 1.2 | 2.4 | 2.4 | 3.0 |

EXAMPLE 3

(according to the present invention)

The present example describes a continuous version of the process.

A 35% strength DCP dihydrate suspension containing phosphoric acid (pH: 3.2) is initially added to a horizontal mixer having a capacity of 150 l. A pure 80% strength phosphoric acid (flow rate: 108 kg/h) and a 24% strength precipitated chalk suspension (flow rate: 347 kg/h; bulk density of dry precipitated chalk: 510 g/l) are metered in with vigorous stirring. The crystal suspension leaving the mixer at the overflow at 32° C. is filtered, and the residue is washed acid-free and dried.

Sieve analyses of this product are carried out after 2, 3, 4 and 6 hours (Table 3). X-ray photographs and analyses show that DCP dihydrate is present. The purity criteria according to USP XX are satisfied.

TABLE 3

| | Experimental Evaluation (Sieve Analysis) for Example 3 | | | |
|---|---|---|---|---|
| | 2 hours | 3 hours | 4 hours | 6 hours |
| >250 μm | 0.2 | 1.3 | 3.2 | 6.1 |
| >125 μm | 79.6 | 76.2 | 71.9 | 70.2 |
| >90 μm | 12.2 | 14.3 | 18.3 | 16.1 |
| >63 μm | 3.4 | 3.7 | 3.5 | 5.2 |
| >63 μm | 4.2 | 4.5 | 3.1 | 2.4 |

What is claimed is:

1. An at least semi-continuous process for the preparation of dicalcium phosphate dihydrate, comprising the steps of:
    (a) providing a dicalcium phosphate dihydrate suspension comprising phosphoric acid and having a pH between about 2.5 and about 4;
    (b) adding a high-grade aqueous phosphoric acid in about 40–85% strength concentration and an aqueous suspension of precipitated chalk in about 20–40% strength concentration to said suspension at a rate sufficient to maintain the pH at a value between about 2.5 and about 4 and to maintain a temperature between about 10° C. and about 60° C., whereby there is formed in said suspension, a dicalcium phosphate dihydrate precipitate having a substantially spherical crystal shape and a particle size in a range between about 63 and about 450 microns;

(c) removing an amount of said suspension containing said precipitate approximately equal to the amount of said aqueous suspension of precipitated chalk and amount of said high-grade aqueous phosphoric acid added to said suspension; and (d) separating said precipitate from said removed amount of said suspension.

2. A process as claimed in claim 1, wherein said maintenance step comprises maintaining the temperature of the reaction between 20° and 45° C.

3. A process as claimed in claim 1, comprising the further step of cooling the reaction.

4. A process as claimed in claim 1, wherein the bulk density of said precipitated chalk is in the range between about 400 and 700 g/l.

5. A process as claimed in claim 1, wherein the bulk density of said precipitated chalk is in the range between about 500 and 600 g/l.

6. A process as claimed in claim 1, wherein said phosphoric acid is added in an amount slightly in excess of the theoretical stoichiometric amount.

7. A process as claimed in claim 6, wherein said phosphoric acid is added in an amount about 10% in excess of the stoichiometric amount.

8. A process as claimed in claim 1, wherein the reaction is performed in a horizontal mixing reactor.

9. A process as claimed in claim 1, wherein the process is performed continuously.

10. A process as claimed in claim 9, wherein said provided dicalcium phosphate dihydrate suspension comprises about 30 to 60% of a reactor capacity.

11. A process as claimed in claim 1, wherein the process is performed semicontinuously and said provided dicalcium phosphate dihydrate suspension comprises about 30 to 60% of a reactor capacity; and wherein the process comprises the further step of repeating step (b) through (d).:

12. A process as claimed in claim 1, wherein said particle size is in a range between about 90 and 300 μm.

13. A process as claimed in claim 1, wherein said dicalcium phosphate dihydrate precipitate is suitable as a carrier substance for direct tableting.

* * * * *